United States Patent

Scharli

[15] 3,653,433

[45] Apr. 4, 1972

[54] COOLING ARRANGEMENT FOR SEMICONDUCTOR VALVES

[72] Inventor: Otto Scharli, Baden, Switzerland

[73] Assignee: Aktiengesellschaft Brown, Boveri & Cie., Baden, Switzerland

[22] Filed: Apr. 15, 1970

[21] Appl. No.: 28,616

[30] Foreign Application Priority Data

Apr. 30, 1969 Switzerland ............................6576/69

[52] U.S. Cl. .............................165/80, 165/105, 317/234 A
[51] Int. Cl.........................................F28f 7/00, F28d 15/00
[58] Field of Search .........................165/80, 105; 317/234 A

[56] References Cited

UNITED STATES PATENTS

| | | | |
|---|---|---|---|
| 2,958,021 | 10/1960 | Cornelison et al. | 165/105 X |
| 3,347,309 | 10/1967 | Webb | 165/105 X |

*Primary Examiner*—John J. Camby
*Attorney*—Pierce, Scheffler & Parker

[57] ABSTRACT

A cooling arrangement for the operating components of an electronic system such as semiconductor valves in disk form comprises cylindric heat sinks having the end faces in contact with the faces of adjacent semiconductor valves to establish flow of heat from the semiconductor disks to the heat sinks, an annular vessel formed at the periphery of each heat sink and a radial array of inclined cooling pipes communicating with the interior of the vessel. The vessel is partially filled with a cooling fluid which, during operation of the valve system is in a liquid as well as a vapor phase. The fluid vapor is forced outwardly along the tubes where it is re-condensed along the tube walls and flows back by gravity.

11 Claims, 6 Drawing Figures

Patented April 4, 1972

3,653,433

2 Sheets-Sheet 1

Inventor

Otto Schärli

By Pierce, Scheffler & Parker

Attorneys

Inventor
Otto Schärli
By Pierce Scheffler & Parker
Attorneys

COOLING ARRANGEMENT FOR SEMICONDUCTOR VALVES

The invention concerns a cooling arrangement, particularly for the operating components of electronic systems, with a closed vessel which is in heat transfer relation with a heat source, i.e., the component to be cooled, and a heat sink, and in which is enclosed a cooling medium that at the operating temperature exists in its liquid as well as in its vapor phase.

In cooling semiconductor power devices such as thyrister valves but also high load electron tubes, the problem frequently exists to remove a quantity of heat generated in a relatively small space without having the temperature at the heat source exceed a given limit value. This temperature limit, however, is relatively low in the case of semiconductor devices, so that the temperature differential available for the heat transfer from the heat source in the semiconductor device to the heat sink constituted by the cooling medium such as, for instance, air or cooling water, is also relatively small. The cooling bodies which are equipped with cooling fins and the like and are common for such purposes, in which the heat transfer is accomplished by heat conduction alone, require, however, a relatively large heat differential for higher cooling performance. Since a high thermal conductivity is required the cooling bodies consist, in most cases, of copper, and this adds to the weight and increases the cost.

In order to reduce the temperature differential required for a given heat flux, there is provided in improved cooling arrangements for semiconductor devices, for instance, according to Swiss patent 342,661, a closed vessel which contains an evaporable cooling liquid and which is in thermally conductive connection on the one hand, with the semiconductor device to be cooled and, on the other hand, via cooling fins with an external cooling medium. By the heat supplied by the semiconductor device the cooling liquid in the vessel is continuously evaporated. The evaporated liquid condenses at the part of the vessel wall which is cooled by the external cooling medium and returns from there to that part of the vessel wall which is in connection with the semiconductor device. Through this kind of heat transfer by convection of an evaporated liquid is achieved that the temperature within the vessel is practically constant and that therefore for the removal of the heat from the semiconductor element essentially only the thermal resistance of the vessel walls and the cooling fins are responsible.

The known cooling arrangements of this type, however, occupy much space in most cases. They have furthermore the drawback that the surface temperature and therefore the heat transfer per unit of area decreases along the cooling fins toward their ends, so that a substantial increase of the cooling power by increasing the area of the cooling fins is possible only to a limited extent.

The invention is based on the task to create a cooling arrangement in which the largest part of the heat transfer from the heat source to the heat sink takes place through convection of an evaporated liquid in a manner known per se and which does not exhibit the shortcomings of the known arrangements of this type.

The cooling arrangement according to the invention is characterized by a heat sink which includes a solid cooling body designed with essentially cylindrical symmetry, an annular shaped vessel in heat transfer relation with the cooling body, and by a radial array of cooling pipes which open into said vessel and which also are in heat transfer relation with the heat sink.

The foregoing as well as other objects and advantages inherent in the invention will become more apparent from the following detailed description of preferred embodiments when considered with the accompanying drawings wherein.

Figure 1:
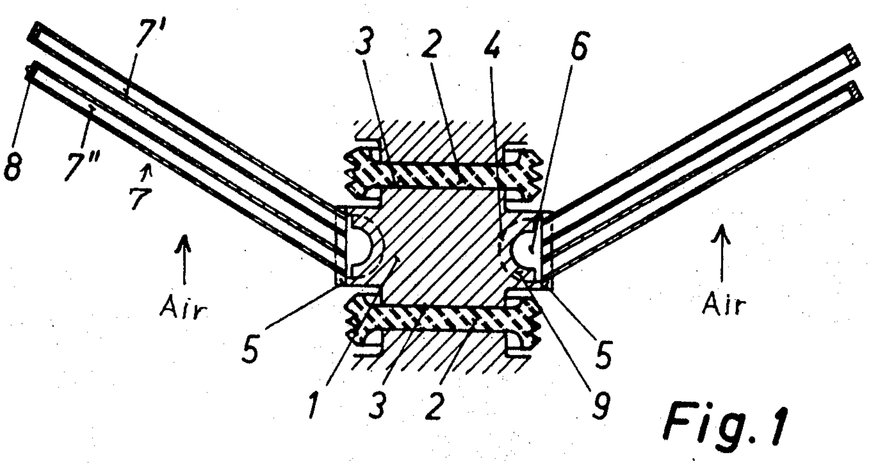
FIG. 1 is a view in transverse vertical section on line I—I of FIG. 2, illustrating one suitable construction for cooling a columnar assembly of semiconductor disk elements.
Figure 2:
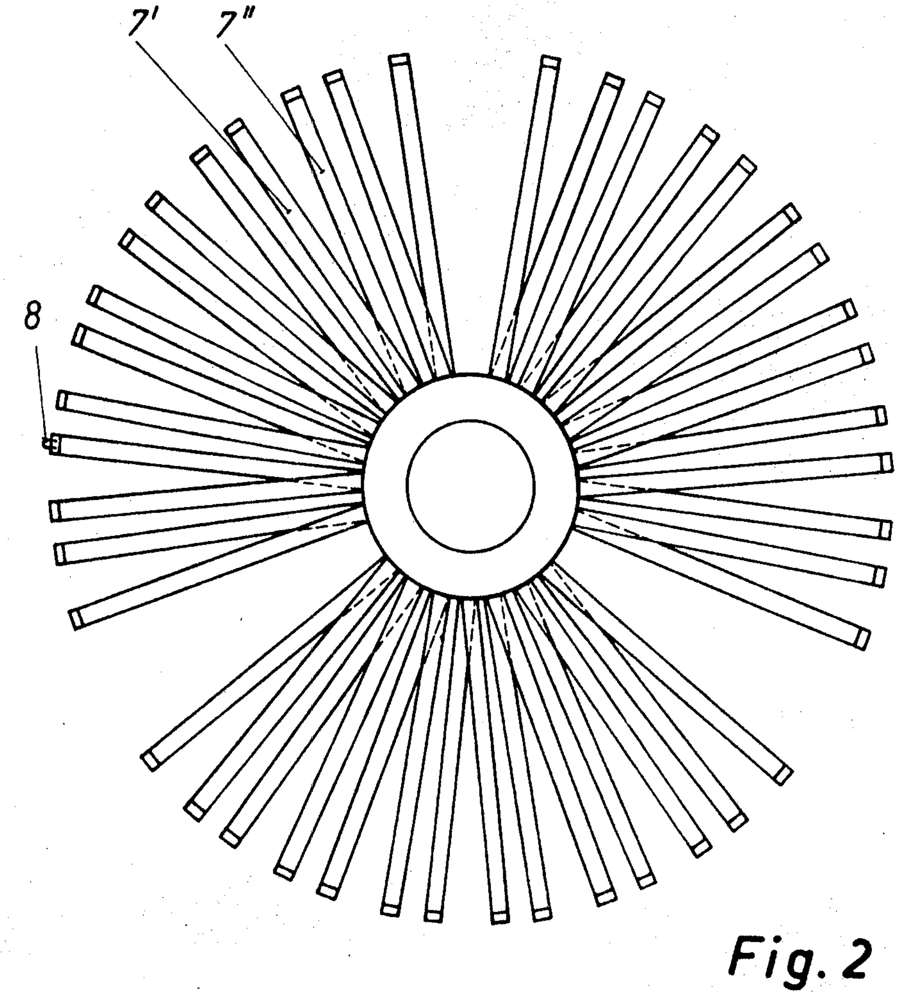
FIG. 2 is a top plan view of the semiconductor arrangement shown in FIG. 1.

With reference now to the embodiment of the invention as shown in FIGS. 1 and 2 it will be seen that the inventive concept is applied to a high-voltage converter installation in which a number of semiconductor disks or valves are superposed electrically in series in a columnar assembly, there being a cooling arrangement located between each two adjacent disks in the assembly. A cylindrical cooling body 1 serving as a heat sink is made from a good heat conductive material such as copper and is provided with plane-parallel end faces which lie in contact respectively with the plane-parallel end faces of two adjacent semiconductor disks 2. The junction line between the end faces of the cooling body and semiconductor disks is indicated at 3. The cooling body 1 has, in its peripheral surface an annular groove 4 which is closed off by a sleeve 5 and thereby forms an annular or ring-shaped vessel 6. The wall of sleeve 5 has two circumferentially extending rows of openings *5a* to which upper and lower, upwardly inclined, radially extending arrays of cooling pipes 7 are connected, the pipes being closed at their outer ends and the axes of which are inclined by an angle of approximately 30° to the horizontal. One of the cooling pipes 7 is equipped at its outer end with a removable filling plug 8, through which a given amount of cooling liquid, for instance, water, can be admitted to the vessel 6. A stream of cooling air indicated by the arrows in blown in a direction parallel to the axis of the cooling arrangement against the cooling pipes 7. In order to assure their uniform cooling by the air stream, the cooling pipes 7′ (FIG. 2) which are connected to the openings of the upper circumferential hole row are aligned so that they are located in the gaps between the cooling pipes 7″ which are connected to the openings of the lower circumferential hole row. To improve the heat transfer from the cooling body 1 to the evaporating cooling liquid enclosed in the vessel 6, the cooling body 1 is provided with cooling fins 9 on its surface which forms part of the inner wall of the vessel 6.

The function of this cooling arrangement is as follows: In the cold condition the vessel 6 is filled approximately half with cooling liquid. In operation, the heat loss developed in the semiconductor disk elements 2 is absorbed by the cooling body 1 and transferred to the cooling liquid in the vessel 6 via the cooling fins 9. The generated vapor due to heating of the liquid to its vapor phase rises outwardly in the upwardly inclined cooling pipes 7, is condensed at the inner walls of the cooling pipes and returns to the vessel 6 by gravity due to the inclination of the array of cooling pipes. As measurements have shown, the temperature along the inner wall of the cooling pipes is practically constant, so that cooling takes place under optimum conditions over the entire cooling surface that lies in heat transfer relation with the flowing cooling air.

Figure 3:
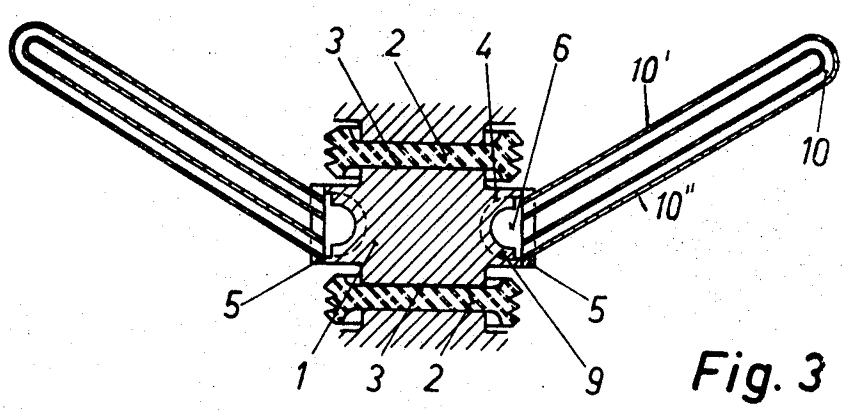
FIG. 3 is a vertical sectional view similar to FIG. 1, on line II—II of FIG. 4 illustrating a modified construction for cooling a columnar assembly of semiconductor disk elements.
Figure 4:
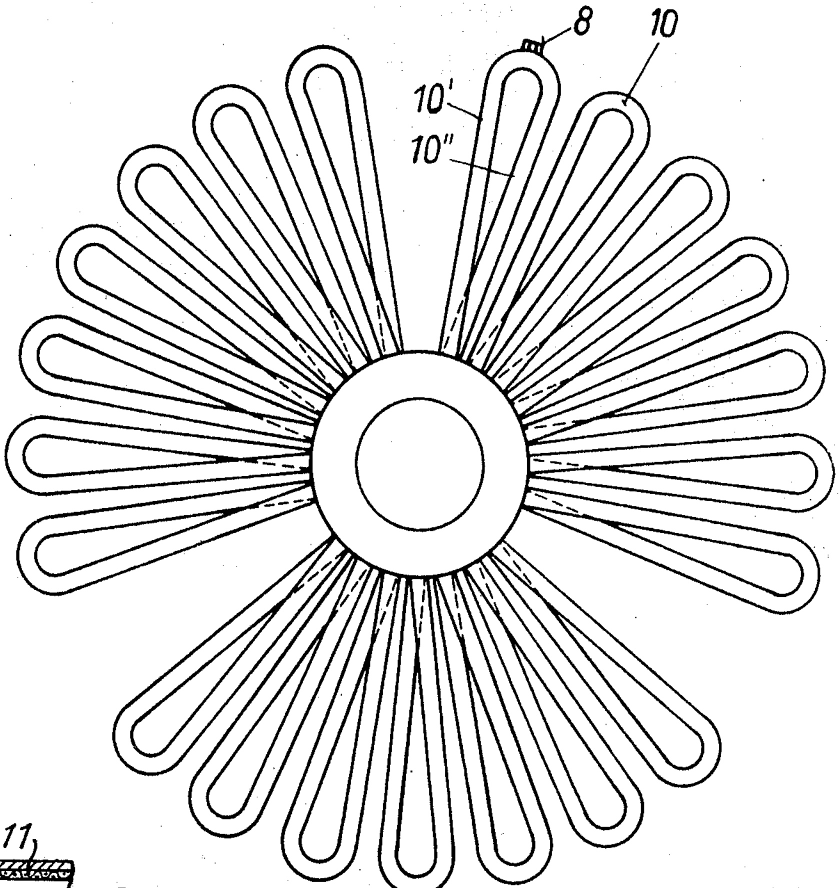
FIG. 4 is a top plan view of the semiconductor arrangement shown in FIG. 3.

FIGS. 3 and 4 show a further advantageous variant of the cooling arrangement. It agrees with the variant according to FIGS. 1 and 2 except for the form of the cooling pipes 10, which are here designed in U-shape, the ends of the legs of the cooling pipes being connected respectively to the upper and lower circumferential rows of openings in the sleeve 5 which are offset in the direction of the axis of symmetry of the cooling body 1. In this connection the legs of the cooling pipes are aligned so that the projections of their axes on a plane perpendicular to said axis of symmetry do not overlap and that therefore both cooling pipe legs are cooled with the same intensity by the stream of cooling air directed parallel to this axis of symmetry.

According to a further feature of the embodiment illustrated in FIGS. 3 and 4, the legs 10'' of the U-shaped cooling pipes which open into the lower circumferential row of openings, as seen in the direction of the vertical, have a smaller cross section than the other legs 10' of the cooling pipes. Through this measure is achieved that the largest part of the vapor generated rises in the cooling pipe legs with the larger cross section, while the larger part of the condensate returns through the other cooling pipe legs which have the smaller cross section. Therefrom results true circulation through the cooling pipes, which leads to a further increase of the cooling efficiency.

Figure 5:
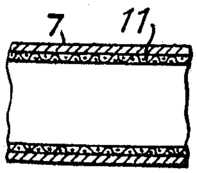
FIG. 5 is a longitudinal central section illustrating a modified construction for a cooling pipe in which the inner wall is lined with a capillary structure.

Further advantageous variants of the cooling arrangement according to the invention show a capillary structure at the inner walls of the cooling pipes 7 illustrated in FIG. 5 in which the condensate is returned to the vessel 6, also against the force of gravity. The capillary structure which lines the pipes 7 is, in this connection formed, in an advantageous manner by wire mesh 11. Such cooling arrangements can be operated in any mounting position.

Figure 6:
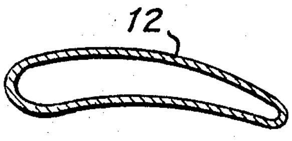
FIG. 6 is a transverse section through a cooling pipe which has a wing-shaped profile.

In order to increase the turbulence of the external cooling medium and therefore the cooling effect, the cooling arrangements can be equipped to advantage with cooling pipes 12 which have a wing-shaped profile as illustrated in FIG. 6.

I claim:

1. In a cooling arrangement, particularly for electronic elements such as semiconductor discs constituting the source of heat to be dissipated, a cooling body having an essentially cylindrical configuration and which is in heat transfer relation with the electronic element to establish a heat sink, an annular shaped vessel surrounding said cylindrical body and in heat transfer relation therewith, said annular shaped vessel being constituted by a peripheral groove in said cylindrical body in conjunction with a cylindrical sleeve which closes off the groove, said sleeve being provided with a circumferentially extending row of openings and a radial array of cooling pipes having their inner ends in communication respectively with said openings in said sleeve, said vessel being partially filled with a cooling medium which during operation of the electronic element is in its liquid as well as in its vapor phase.

2. A cooling arrangement as defined in claim 1 wherein each end face of said cylindrically configured cooling body is adapted so that a semiconductor disk lies in contact therewith.

3. A cooling arrangement as defined in claim 1 wherein the surface of said cooling body which forms part of the inner wall of said vessel is provided with cooling fins.

4. A cooling arrangement as defined in claim 1 wherein the said cooling pipes forming said array are inclined upwardly at an angle greater than 10° to establish a gravity flow return of fluid from the outer end portions of said pipes.

5. A cooling arrangement as defined in claim 1 wherein said cooling pipes have wing-shaped profiles.

6. A cooling arrangement as defined in claim 1 wherein the inner wall surfaces of said cooling pipes are provided with a capillary structure.

7. A cooling arrangement as defined in claim 6 wherein said capillary structure on the inner wall surfaces of said cooling pipes is established by a wire mesh.

8. A cooling arrangement as defined in claim 1 wherein two radial arrays of cooling pipes are provided, said arrays being disposed one above the other and opening into said vessel through corresponding upper and lower circumferentially extending rows of openings provided in said sleeve.

9. A cooling arrangement as defined in claim 8 wherein the cooling pipes of the two radially arrays are offset from each other so that the pipes of one array are aligned with the spaces between adjacent pipes of the other array thereby to ensure optimum cooling by an airstream passing through the arrays parallel to the axis of the arrays.

10. A cooling arrangement as defined in claim 1 wherein said cooling pipes have a U-shaped configuration, the legs forming each of said pipes being connected respectively to two openings in said sleeve which are offset with respect to each other in the direction of the axis of symmetry.

11. A cooling arrangement as defined in claim 10 wherein the legs of the U-shaped cooling pipes which are connected into the lower positioned openings in said sleeve have a smaller cross section than the other legs of said U-shaped cooling pipes which are connected to the upper positioned openings in said sleeve.

* * * * *